United States Patent [19]

Suzuki

[11] Patent Number: 5,053,957
[45] Date of Patent: Oct. 1, 1991

[54] ELECTRONIC CASH REGISTER HAVING DISCOUNT PRICES SELECTED BY CUSTOMER LEVEL

[75] Inventor: Yasuo Suzuki, Nagaokakyo, Japan

[73] Assignee: Omron Tateisi Electronics Co., Kyoto, Japan

[21] Appl. No.: 260,059

[22] Filed: Oct. 20, 1988

[30] Foreign Application Priority Data

Oct. 23, 1987 [JP] Japan ................................ 62-267819

[51] Int. Cl.$^5$ .............................................. G07G 1/12
[52] U.S. Cl. .................................................. 364/405
[58] Field of Search ........ 364/404, 405, 200 MS File, 364/900 MS File

[56] References Cited

U.S. PATENT DOCUMENTS

| | | |
|---|---|---|
| 4,635,196 | 1/1987 | Nakamura et al. |
| 4,707,785 | 11/1987 | Takagi ................................ 364/405 |
| 4,734,857 | 3/1988 | Fujiwara et al. ................... 364/405 |
| 4,800,493 | 1/1989 | Takagi ................................ 364/405 |
| 4,821,168 | 4/1989 | Munakata et al. .................. 364/405 |

FOREIGN PATENT DOCUMENTS

| | | |
|---|---|---|
| 0189830 | 6/1986 | European Pat. Off. . |
| 0234402 | 2/1987 | European Pat. Off. . |
| 155475 | 9/1983 | Japan . |
| 114267 | 10/1983 | Japan . |
| 183464 | 10/1984 | Japan . |
| 121467 | 11/1984 | Japan . |

Primary Examiner—Jerry Smith
Assistant Examiner—Steven G. Kibby
Attorney, Agent, or Firm—Dickstein, Shapiro & Morin

[57] ABSTRACT

An electronic cash register includes a means for storing information having respective discount prices corresponding to customer discount levels (customer levels), a code input means for entering codes of goods to be purchased, a memory for storing unit prices for each customer level of those goods subject to customer level discounts, and a reading means for reading a unit price of goods by reviewing the stored unit prices for the goods code entered by the code input means. If a key designating a customer level is depressed, the unit price of the goods designated by the subsequently entered goods designation codes for the entered customer level is read out from the memory and registered for every entry of the goods code.

15 Claims, 8 Drawing Sheets

| GOODS NAME | LEVEL 3 | LEVEL 2 | LEVEL 1 | LEVEL 0 | |
|---|---|---|---|---|---|
| MEN'S SUIT | 38,000 | 40,000 | 45,000 | 50,000 | ---GOODS1 |
| BAG | 12,000 | 13,000 | 14,000 | 15,000 | ---GOODS2 |
| TIE | — | — | — | 4,000 | ---GOODS3 |
| MEN'S SHOES | 8,500 | 8,700 | 9,500 | 10,000 | ---GOODS4 |
| SHIRT | 5,000 | 5,100 | 5,300 | 5,500 | ---GOODS5 |

LEVEL 0 — GUEST PRICE
LEVEL 1 — MEMBER PRICE
LEVEL 2 — EMPLOYEE PRICE
LEVEL 3 — STOCK HOLDER PRICE

FIG. 3
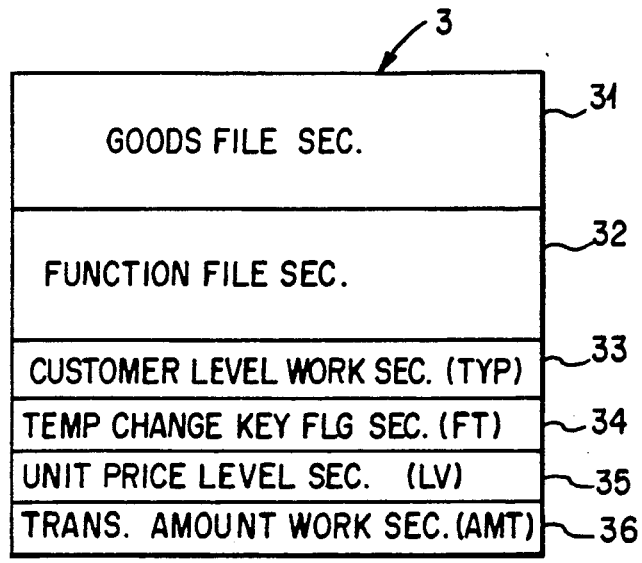
FIG. 4
| GOODS NAME | LEVEL 3 | LEVEL 2 | LEVEL 1 | LEVEL 0 | |
|---|---|---|---|---|---|
| MEN'S SUIT | 38,000 | 40,000 | 45,000 | 50,000 | ---GOODS1 |
| BAG | 12,000 | 13,000 | 14,000 | 15,000 | ---GOODS2 |
| TIE | — | — | — | 4,000 | ---GOODS3 |
| MEN'S SHOES | 8,500 | 8,700 | 9,500 | 10,000 | ---GOODS4 |
| SHIRT | 5,000 | 5,100 | 5,300 | 5,500 | ---GOODS5 |
- LEVEL 0: GUEST PRICE
- LEVEL 1: MEMBER PRICE
- LEVEL 2: EMPLOYEE PRICE
- LEVEL 3: STOCK HOLDER PRICE
FIG. 6
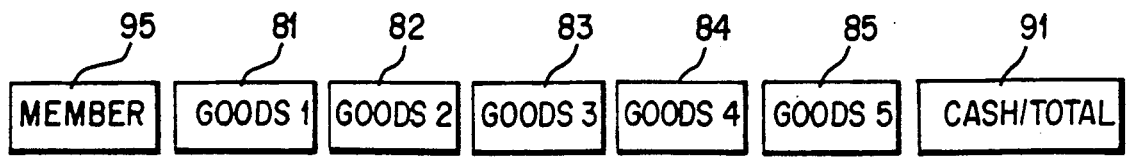

FIG. 7

MEMBER DISCOUNT

| | |
|---|---|
| MEN'S SUIT | 45,000 |
| BAG | 14,000 |
| TIE | 4,000 |
| MEN'S SHOES | 9,500 |
| CUTTER SHIRT | 5,300 |
| CASH TOTAL | 77,8,000 YEN |

THANK YOU

FIG. 8

MEN'S SUIT   45,000

STOCK HOLDER   EMPLOYEE   MEMBER   } 6

FIG. 9

| 95 | 81 | 82 | 96 | 94 | 84 | 85 | 95 |
|---|---|---|---|---|---|---|---|
| MEMBER | GOODS 1 | GOODS 2 | TEMP. CHANGE | EMPLOYEE | GOODS 4 | GOODS 5 | CASH/TOTAL |

FIG. 10

MEMBER DISCOUNT

| | | | |
|---|---|---|---|
| MEN'S SUIT | 45,000 | ← PRICE LEVEL | 1 |
| BAG | 14,000 | ← " | 1 |
| MEN'S SHOES | 8,700 | ← " | 2 |
| CUTTER SHIRT | 5,300 | ← " | 1 |
| CASH TOTAL | 73,000 YEN | | |

THANK YOU

ELECTRONIC CASH REGISTER HAVING DISCOUNT PRICES SELECTED BY CUSTOMER LEVEL

BACKGROUND OF THE INVENTION

1. Field of the Invention

This invention relates to an electronic cash register, and more particularly to an improved electronic cash register having a means for registering discount prices for goods, which discount prices are associated with various customer discount levels.

2. Discussion of the Related Art

In a conventional electronic cash register (hereinafter ECR) used for selling goods at different discount prices in accordance with a class of customers, also termed customer levels, a plurality of discount prices assigned to the customer levels, such as members, employees, stockholders, general customers and so on, are prestored for specific goods. In an actual transaction, the prices corresponding to the customer level are read out from the prestored prices for registration.

As illustrated in FIG. 18, a key for designating the level of the customer must be actuated for each registration of the specific goods in such a conventional ECR. Accordingly, the conventional ECR has the disadvantages that the operator has to remember the goods among all goods in the store which have customer level discounts and actuate the designation key corresponding to the customer level for each registration of goods, which is troublesome. Thus, problems arise as an operator can easily forget to input a designation of the correct customer level, or a wrong key actuation can occur.

SUMMARY OF THE INVENTION

It is, therefore, a primary object of this invention to provide an electronic cash register capable of registering different discount unit prices corresponding to the class or level of customers in a registration mode without actuating a level designation key for each of the specific goods and without requiring that an operator learn which goods are subject to the discounts.

According to this invention, there is provided an electronic cash register including a means for storing information concerning goods having a discount price corresponding to a customer discount level, a code input means for entering codes of goods to be purchased, a memory for storing unit prices of goods for each customer level, both for goods having regular prices and discount prices, and a reading means for reading a unit price of goods by reviewing the stored unit prices in accordance with a goods code entered by the code input means.

BRIEF DESCRIPTION OF THE DRAWINGS

The above and other objects, advantages and features of this invention will be more fully understood from the following detailed description of the invention which is provided in conjunction with the following drawings, of which:

FIG. 3 is a memory map of a RAM employed in the electronic cash register;

FIG. 4 shows an example of the contents of a goods file section of the RAM;

FIG. 6 shows a key sequence illustrating an example of a key operation;

FIG. 7 shows an example of a printed sheet issued from a printer;

FIG. 8 shows a pattern of a display;

FIG. 9 shows a key sequence illustrating another example of a key operation;

FIG. 10 shows another example of a printed sheet;

FIG. 13 shows an example of the contents of the goods file section of the RAM;

FIG. 18 is a key sequence illustrating a conventional key operation for a conventional electronic cash register.

DETAILED DESCRIPTION OF THE INVENTION

Although this application uses the term, "goods" when referring to purchasable items, it should be understood that the invention can be used to store unit prices of purchasable services as well. For simplicity of description, the term "goods" will be used in the remainder of the specification.

Referring to FIGS. 1-10, there is shown a first embodiment of an electronic cash register according to this invention.

Figure 1:
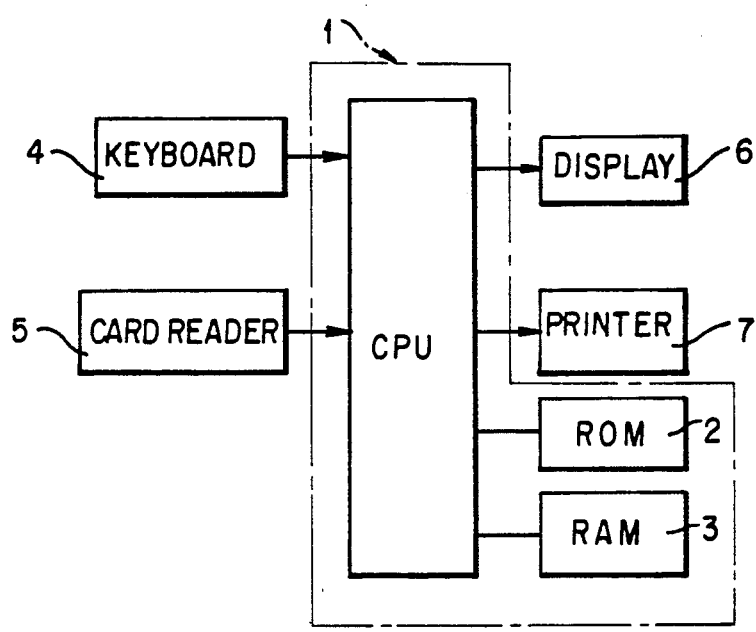
FIG. 1 is a schematic block diagram of a first embodiment of an electronic cash register according to this invention.

FIG. 1 shows a block diagram representing an electronic construction of the register, in which a controller 1 is formed by a microcomputer including a CPU, ROM 2 and RAM 3 and connected with a keyboard 4, a card reader 5, a display 6 and a printer 7.

Figure 2:
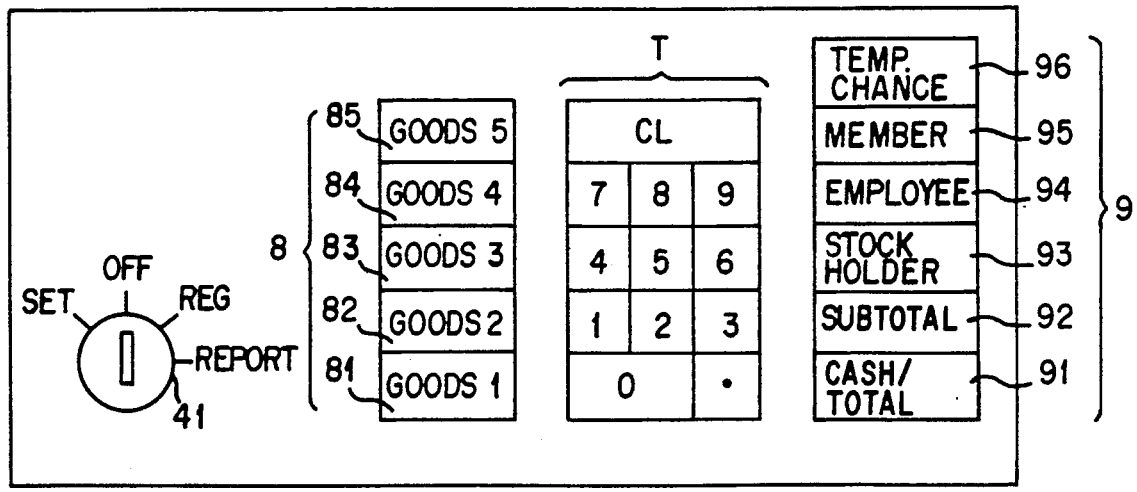
FIG. 2 shows a key arrangement of the keyboard employed in the electronic cash register of FIG. 1.

FIG. 2 shows a key arrangement of the keyboard 4 including a goods key group 8, a common ten-key keypad T and a customer class or level key group 9.

A key insertion section 41 is provided with a power switch for the electronic cash register, and has a setting mode (SET) for setting a code of goods and a unit price of each level of the goods, a registering mode (REG) for registering goods in actual transactions, and a report mode (REPORT) for externally reporting the contents of executed transactions.

FIG. 3 illustrates the contents of RAM 3 of the controller 1, which consists of a goods file section 31 storing unit prices entered therein, a function file section 32, a customer level work (TYP) section 33 storing a level of a customer entered therein for each transaction, a temporary change key flag (FT) section 34 storing a flag when a signal is generated from a "TEMPORARY CHANGE" key 96 of the keyboard, a unit price level (LV) section 35 for temporarily storing a unit price level set corresponding to the level stored in the customer level work section 33, and a transaction monetary amount work (AMT) section 36 for accumulating prices of goods subsequently registered in each transaction for storage.

Referring to FIG. 4, the contents stored in goods file section 31 are illustrated. In the goods file section 31, unit prices corresponding to each customer level are stored for the respective goods. In this embodiment, the customer level is divided into four levels corresponding to general customers, members, employees, and stockholders in the order of descending unit prices. In the goods file section 31, specific goods, that is, goods having discount prices according to the customer level, and regular goods having no discount price coexist. In FIG. 4, "TIES" under GOODS 3 are regular goods, that is, goods which have no discount price, and the other identified goods are so-called specific goods which are subject to the discounts depending on customer level. It should be noted that as to regular goods the unit price is stored only in the customer level 0 (corresponding to general customers) and no price is stored in the customer levels 1-3. This provides a stored indication as to whether the respective goods are regular goods subject to no discount or specific goods subject to the customer level discounts.

The operations of the thus constructed electronic cash register will be described hereinafter referring to the flow chart of FIG. 5 and the key sequence of FIG. 6.

Prior to a registration of goods, a key is inserted into the key insertion unit 41 to turn on the power switch and set the cash register to the registering (REG) mode. This places the electronic cash register in a stand-by status for goods registration (STEP 101).

Figure 5:
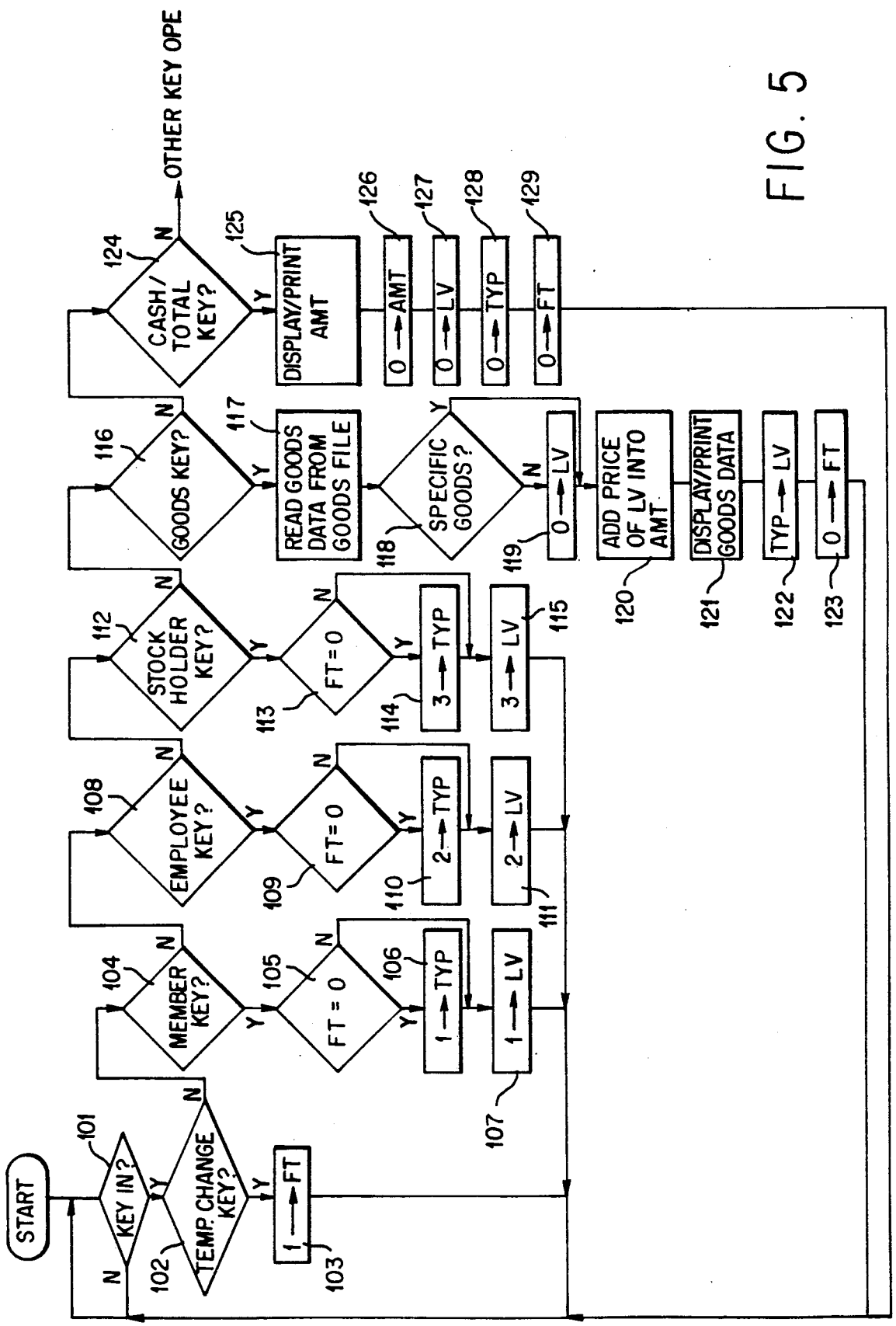
FIG. 5 is a flow chart of a control program of the electronic cash register of FIG. 1.

If a customer is a member and the "MEMBER" key 95 is depressed, as exemplarily illustrated in FIG. 6, the sequence in FIG. 5 flows through STEP 101-YES (a key input is recognized), STEP 102-NO (the depressed key is not the TEMP CHANGE key 96) STEP 104-YES (the depressed key is the MEMBER key) and STEP 105-NO (the TEMP CHANGE flag FT has not been reset) to STEPS 106 and 107 wherein a logical "1" is written into the RAM at customer level work (TYP) section 33 and unit price level (LV) section 35.

Following the FIG. 6 key sequence, if "GOODS 1" key 81 is next depressed to enter the goods code of the GOODS 1 bought by the customer, the goods code is entered (STEP 101-YES, STEP 102-NO (MEMBER key not currently depressed), STEP 108-NO (EMPLOYEE key not currently depressed) STEP 112-NO (STOCKHOLDER key not presently depressed) and STEP 116-YES (a GOODS key is currently depressed) and the unit price group for GOODS 1 is read from the goods file section 31 of the RAM (STEP 117).

Since different unit prices for each customer level exist in the read out unit price group of the GOODS 1, the GOODS 1 is regarded as specific goods (STEP 118-YES).

Then, the unit price "45,000" yen corresponding to the customer level 1 (MEMBER) stored in the unit price level (LV) section 35 is selected from the unit price group and added into the transaction monetary amount work (AMT) section 36 (STEP 120).

In STEP 121, the GOODS 1's name "MEN'S SUIT" and unit price "45,000" are printed on a slip together with the customer's level ("MEMBER DISCOUNT") by printer 7, as shown in FIG. 7 and displayed on the display 6 as shown in FIG. 8.

In STEP 122, a "1" stored in the customer level work (TYP) section 33 is written into the unit price level (LV) section 35. Then a "0" is written into the "TEMPORARY CHANGE" key flag (FT) section 34 (STEP 123). Thus, if as shown in FIG. 6, the "GOODS 2" key 82 is next depressed to enter the goods code of GOODS 2, the electronic cash register registers the goods in a sequence similar to the above-mentioned sequence for GOODS 1. That is, the unit price group for GOODS 2 is read from goods file section 31 and the unit price for customer level 1 is selected from the unit price group and added into the transaction monetary amount work (AMT) section, while the GOODS 2 name and unit price are printed and displayed.

If, as shown in FIG. 6, the "GOODS 3" key 83 is next depressed to enter its goods code, the GOODS 3 is determined to be regular goods in STEP 118-NO (no discount) because a unit price is found only in the customer level "0" area of "GOODS 3" (FIG. 4) among the unit price group read from the goods file section 31 of the RAM. As a consequence, in STEP 119, "0" is written into the unit price level (LV) section 35. In STEP 120, the unit price "4,000" yen corresponding to the level "0" stored in the unit price level (LV) section 35 is selected from the unit price group and added into the transaction monetary amount work (AMT) section 36. The GOODS 3's goods name "TIE" and unit price "4,000" yen are printed by the printer as shown in FIG. 7 and displayed on the display (STEP 121). Then, in STEP 122, a "1" stored in customer level work (TYP) section 34 is written into the unit price level (LV) section 35. In STEP 123, a "0" is written into "TEMPORARY CHANGE" key flag (FT) section 34.

Subsequently, if as shown in FIG. 6, GOODS 4 and 5 are to be registered, the respective unit prices are sequentially added into the AMT section 36 (STEP 120) and printed/displayed (STEP 121) in the same sequence as that of GOODS 1. Other goods are registered likewise.

When the registration of all goods to be purchased is completed, the "CASH/TOTAL" key 92 is depressed (STEP 124-YES), and the total monetary amount of the transaction stored in the AMT section 36 is printed as shown in FIG. 7 and displayed on the display 6 (STEP 125).

Subsequently, a "0" is written into the AMT section 36 (STEP 126), into the LV section 35 (STEP 127), into the TYP section 33 (STEP 128) and into the FT section 34 (STEP 129). Thus, one transaction is completed for one customer.

The situation where the operator wants to change the customer level by depressing the "TEMPORARY CHANGE" key and the way of entering goods codes in the operation of this embodiment will now be described. This feature is useful when an operator wishes to change a customer level during a transaction.

An example of the key sequence is shown in FIG. 9. The key operations which occur until the "TEMPORARY CHANGE" key 96 is depressed are the same as those in FIG. 6 and the internal operations of the electronic cash register are the same as the above-described operations, so that an explanation of the operations occurring prior to depression of the key 96 is omitted for simplicity. Referring to FIG. 5, if the "TEMPORARY CHANGE" key 96 is depressed, the depression of the key is detected (STEP 102-YES) and a "1" is written into the temporary change key flag (FT) section 34 (STEP 103).

As shown in FIG. 9, an "EMPLOYEE" key 94 is next depressed to change the level of the purchaser from a "MEMBER" to an "EMPLOYEE", and the depression is detected (STEP 101-YES, STEP 102-NO, STEP 104-NO and STEP 108-YES). In inquiry STEP 109, the status of whether the "TEMPORARY CHANGE" key 96 was previously actuated is determined by determining whether or not the FT section 34 is "0". Since the "TEMPORARY CHANGE" key has been operated, a NO response is produced from STEP 109 (since FT=1 from STEP 103) and the level "2" representing the "EMPLOYEE" level is written into the unit price level (LV) section 35 (STEP 111).

Returning to FIG. 9, if the "GOODS 4" key 84 is next depressed to enter the goods code of GOODS 4 to be registered after a change of the customer level, (STEP 101-YES, STEP 102-NO, STEP 104-NO, STEP 108-NO, STEP 112-NO, and STEP 116-YES) the unit price group of goods 4 is read out from the goods file section 31 of the RAM (STEP 117).

Since the read out unit price group of GOODS 4 includes a plurality of different unit prices for various customer levels, GOODS 4 is regarded as specific goods (STEP 118-YES). In the unit price group the unit price "8,700" yen corresponding to the customer level "2", i.e. "EMPLOYEE" level, stored in the LV section 35 is selected and added into the AMT section 36 (STEP 120). Then GOODS 4's goods name "MEN'S SHOES" and unit price "8,700" yen are printed by the printer 7 as shown in FIG. 10 and displayed on the display 6 (STEP 121). In STEP 122, the level "1" stored in the customer level work (TYP) section 33 is written into the LV section 35. IN STEP 123, a "0" is written into the FT section 34 and the temporary customer level change is finished.

Continuing with FIG. 9, depression of the "GOODS 5" key 85 enters the goods code of GOODS 5, and the unit price for customer level "2" for goods 5 are selected, printed and displayed. Following this, the registration operation is completed by depression of the "CASH/TOTAL" key 91.

In order to determine whether an item purchased by a customer falls in the category of specific (discount) goods or regular (non-discount) goods in this embodiment, the system assumes specific goods if a plurality of unit prices for every customer level are stored in the unit price group read from the goods file section 31 of the RAM 3, or regular goods, if not. Alternatively, the discrimination of specific and regular goods may be made by setting flags for each purchase item.

Referring to FIGS. 11–17, there is illustrated a second embodiment of this invention. The electronic cash register according to this second embodiment has the same internal construction as that of FIG. 1. The same components as those of the first embodiment are represented by the same reference numerals in this embodiment.

Figure 11:
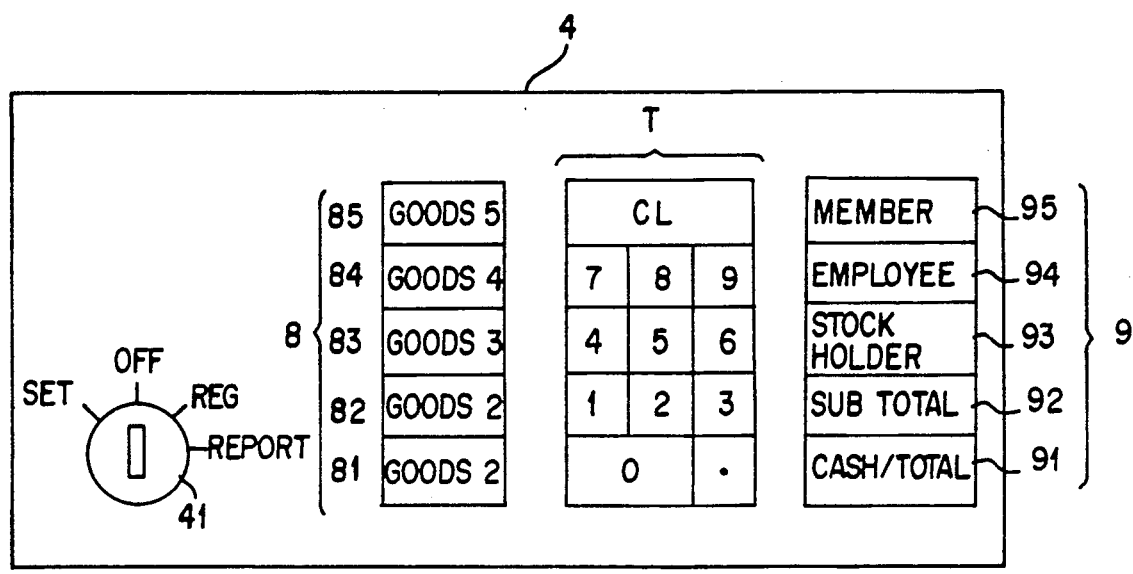
FIG. 11 shows a keyboard section of a second embodiment of an electronic cash register according to this invention.

FIG. 11 shows a keyboard employed in this second embodiment which includes a goods key group 8 for entering goods codes, a ten-key keypad T, and a customer level key group 9. Key insertion section 41 is provided with a power source switch, a setting mode (SET) for setting goods codes and their unit prices for each level, a registering mode (REG) for registering goods in actual transactions, and a report mode (REPORT) for issuing a report concerning registered transactions.

Figure 12:
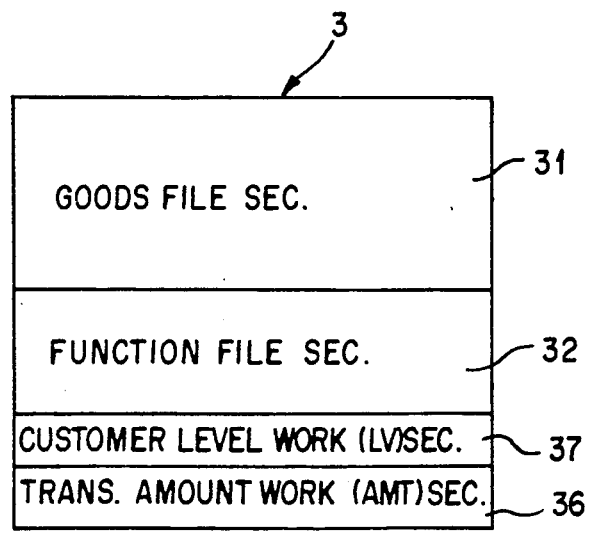
FIG. 12 is a memory map of RAM employed in the electronic cash register of FIG. 11.

FIG. 12 shows the contents of RAM 3 which includes a goods file section 31 for storing unit prices for each goods, a function file section 32, a customer level work (LV) section 37 for storing the customer level entered for each transaction, and transaction monetary amount work (AMT) section 36.

FIG. 13 shows the contents of the goods file section 31 in which goods names and their unit prices by customer level are stored. The customer level is again divided into four levels corresponding to general customers, members, employees and stockholders. Specific goods having discount prices corresponding to the class of customers and regular goods having no discount price coexist in the goods file section 31.

In FIG. 13, the GOODS 3, "TIE" has the same unit price over all customer levels which provides an indication that the goods are regular (non-discount) goods, while other goods having various discount prices for the different customer levels are designated as specific (discount) goods.

Figure 14:
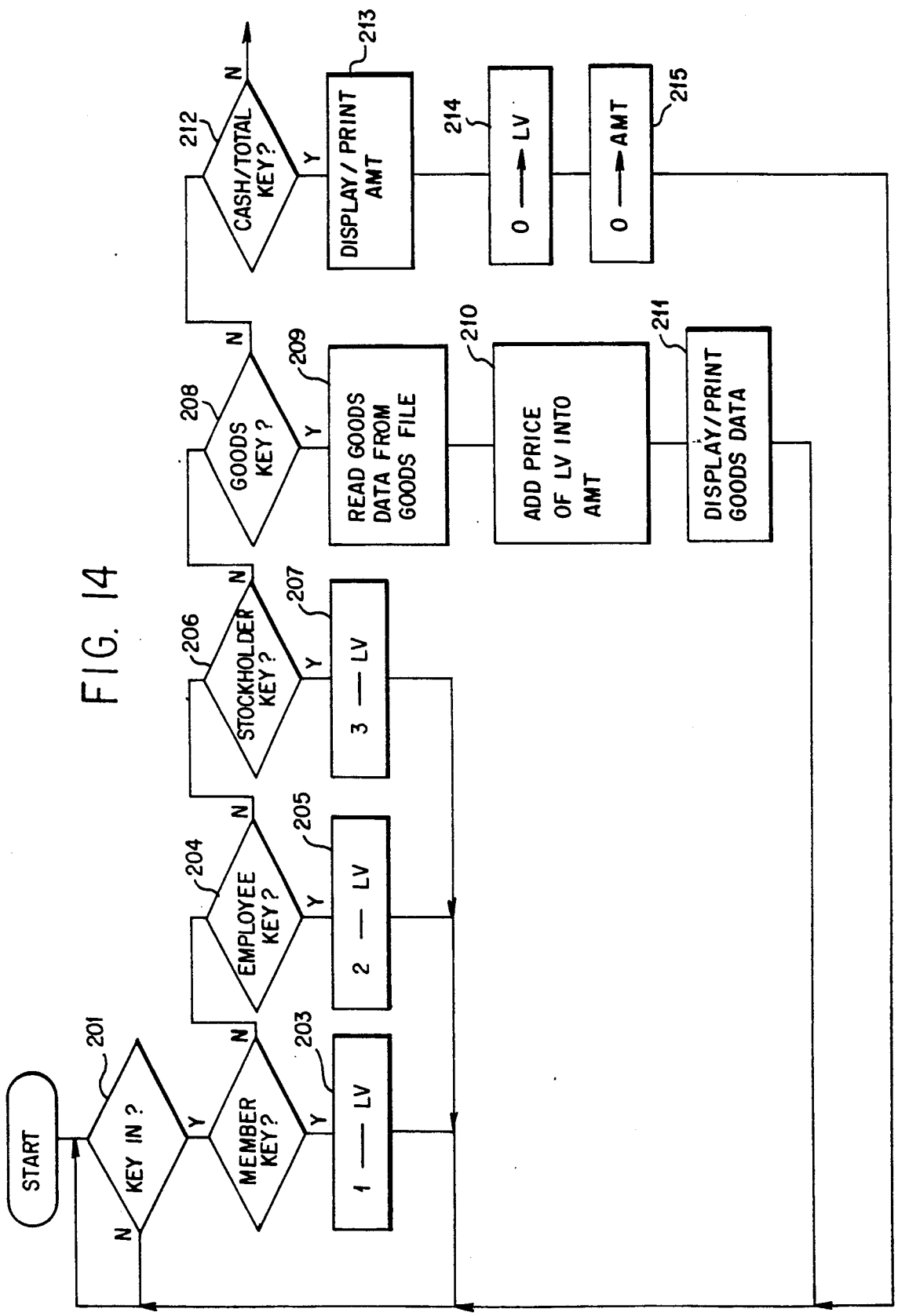
FIG. 14 is a flow chart of a control program of the electronic cash register.

The operations of thus constructed electronic cash register of this embodiment will be described hereinafter in conjunction with the flow chart of FIG. 14 and a key sequence of FIG. 15. The electronic cash register is set to the registering mode by inserting a key into the key insertion section 41 to turn on the power source switch, and then is in a stand-by condition (STEP 201).

Figure 15:
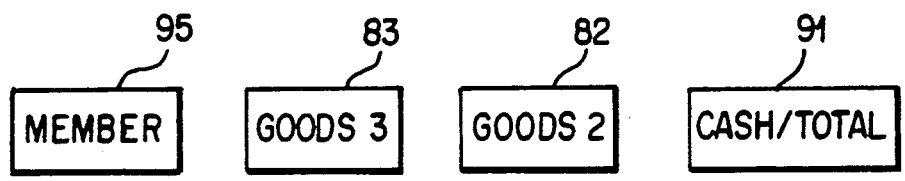
FIG. 15 is a key sequence illustrating a key operation.

The keys are operated in accordance with the sequence of FIG. 15. If the customer is a member, the "MEMBER" key 95 is depressed (STEP 210-YES, STEP 202-YES) and the level "1" is written into the LV section 37 of the RAM (STEP 201).

As the "GOODS 3" key 83 is depressed to enter the goods code of GOODS 3 bought by the purchaser, the sequence for entering the goods is executed (STEP 201-YES, STEP 202-NO, STEP 201-No, STEP 206-NO, STEP 208-YES) and the unit price group of GOODS 3 is read out from the goods file section 31 (STEP 209).

The unit price "4,000" yen corresponding to the customer level "1" ("MEMBER") stored in the LV section 37 is selected from the read out unit price group of GOODS 3 and added into the AMT section 36 (STEP 210).

Figure 16:
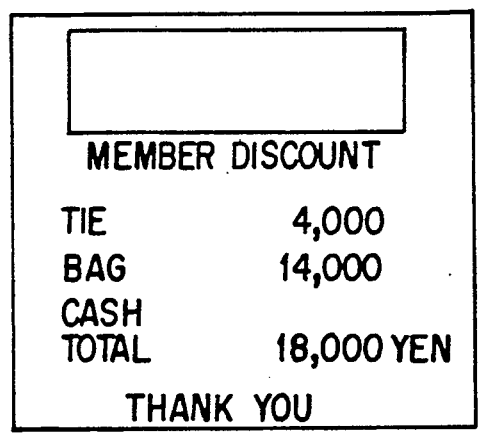
FIG. 16 is an example of a printed sheet.
Figure 17:
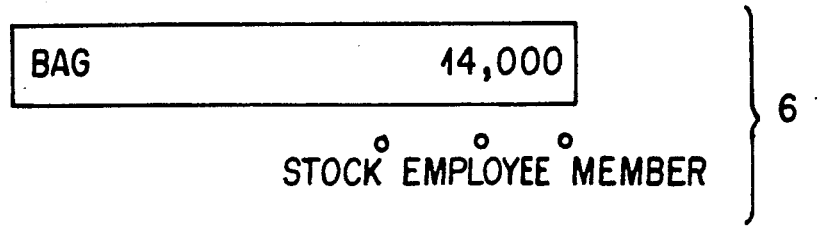
FIG. 17 shows a pattern of a display.

Then, the goods name "TIE" of GOODS 3, its price "4,000", yen and the customer level are printed by printer 7, as shown in FIG. 16, and displayed on the display 6 as shown in FIG. 17 (STEP 211).

If the "GOODS 2" key 82 is depressed to enter the goods code of GOODS 2, operations similar to those of GOODS 3 are executed to enter the code and respective unit prices are subsequently added into the AMT section 36 for summation. When the registration for all goods is finished, the "CASH/TOTAL" key 91 is depressed and detected (STEP 212-YES). In STEP 213, the total monetary amount stored in the AMT section 36 is printed as illustrated in FIG. 16 and displayed on the display 6. A "0" is written into the LV section 37 (SECTION 214) and into the AMT section 36. Thus, one transaction for one customer is finished.

According to this embodiment, a unit price for all customer levels is written into the goods file section 31 for the regular (no discount) goods as well as for the specific (discount) goods, whereby the corresponding unit price is registered without requiring any discrimination between the specific and regular goods when the goods code is entered.

In the above-mentioned first and second embodiments, the designation of the customer level is executed through keyboard 4. If desired, a card identifying the level of the card holder may be assigned to a customer and be read by the card reader 5 during the transaction to enter the customer's level into the customer level work section (33 or 37). In this modification, the customer level is read from the section (33 or 37), the same operations of the first or second embodiment are available except key operation of the customer level by key group 9. It should also be understood that goods codes may be entered by a conventional bar code scanning method instead of using a key operation of the goods key group 8.

While preferred embodiments of the invention have been described and illustrated, it should be apparent that many modifications can be made without departing from the spirit and scope of the invention. Accordingly, the invention is not limited by the foregoing description but is only limited by the scope of the appended claims.

What is claimed is:

1. An electronic cash register comprising:
   means for storing respective unit prices for each of a plurality of customer levels for at least one predetermined purchasable item or service which is subject to differing customer level discounts; said storing means also storing a respective unit price for at least one predetermined item or service which is not subject to said customer level discounts; said plurality of customer levels being identified by respective customer level codes;
   means for entering a customer level code and an item or service code;
   means responsive to an entered customer level code and an entered item or service code for selecting from said storing means a unit price of an item or service corresponding to said entered customer level code and item or service code; and,
   means for using said selected unit price in a registration operation;
   said storing means comprising a first storage area having a first storage level for storing regular prices for each of a plurality of items or services, and a second storage area for storing, in accordance with customer levels, respective discount prices associated with each of the customer levels for each of a plurality of items or services subject to customer level discounts, said storing means also storing an indication of whether a particular item or service is subject to customer level discounts;
   said selecting means including means for examining said storing means and discriminating among items or services which are subject to customer level discounts and those which are not by said stored indication for an entered item or service code.

2. An electronic cash register as in claim 1, wherein said indication is provided by the storage in said second storage area of the regular unit prices for those items or services which are not subject to customer level discounts.

3. An electronic cash register as in claim 1, wherein said indication is provided by storing, for each item or service, a flag indicating whether each item or service is subject to a customer level discount.

4. An electronic cash register as in claim 1, wherein said entering means comprises a plurality of selectable entry keys each for entering a respective customer level code and a plurality of selectable item or service keys, each for entering a respective item or service code.

5. An electronic cash register as in claim 1, wherein said entering means includes a bar code reader for reading item or service codes.

6. An electronic cash register as in claim 1, wherein said selecting means further includes means for reading a unit price corresponding to an entered item or service code from said first storage area when said storing means indicates that an entered item or service code corresponds to an item or service not subject to customer level discounts, and for reading a unit price corresponding to an entered item or service code from said second storage area in accordance with an entered item or service code when said storing means indicates that an entered item or service code corresponds to an item or service subject to customer level discounts.

7. An electronic cash register comprising:
   means for storing respective unit prices for each of a plurality of customer levels for at least one predetermined purchasable item or service which is subject to differing customer level discounts; said storing means also storing a respective unit price for at least one predetermined item or service which is not subject to said customer level discounts; said plurality of customer levels being identified by respective customer level codes;
   means for entering a customer level code and an item or service code;
   means responsive to an entered customer level code and an entered item or service code for selecting from said storing means a unit price of an item or service corresponding to said entered customer level code and item or service code; and
   means for using said selected unit price in a registration operation, wherein said selecting means includes means responsive to an entered customer level code for selecting a series of unit prices based on a subsequently entered series of item or service codes without requiring another entry of said customer level code for each item or service in said series.

8. An electronic cash register as in claim 7, further comprising temporary change data entry means for entering temporary change data, and means responsive to an entered temporary change data and to a subsequently entered customer level code for causing said selecting means to thereafter select unit prices in accordance with said subsequently entered customer level code and item or service codes entered after entry of said subsequently entered customer level code.

9. An electronic cash register comprising:
   means for storing respective unit prices for each of a plurality of customer levels for at least one predetermined purchasable item or service which is subject to differing customer level discounts; said storing means also storing a respective unit price for at least one predetermined item or service which is not subject to said customer level discounts; said plurality of customer levels being identified by respective customer level codes;
   means for entering a customer level code and an item or service code;
   means responsive to an entered customer level code and an entered item or service code for selecting from said storing means a unit price of an item or service corresponding to said entered customer level code and item or service code; and
   means for using said selected unit price in a registration operation;
   said storing means comprising a first storage area having a first storage level for storing regular prices for each of a plurality of items or services, and a second storage area for storing, in accordance with customer levels, respective discount prices associated with each of the customer levels for each of a plurality of items or services subject to customer level discounts, said storing means also storing an indication of whether a particular item or service is subject to customer level discounts, wherein said indication is provided by the lack of storage in said second storage area of unit prices for those items or services which are not subject to customer level discounts;

said selecting means including means for examining said storing means and discriminating among items or services which are subject to customer level discounts and those which are not by said stored indication for an entered item or service code.

10. An electronic cash register comprising:

means for storing respective unit prices for each of a plurality of customer levels for at least one predetermined purchasable item or service which is subject to differing customer level discounts; said storing means also storing a respective unit price for at least one predetermined item or service which is not subject to said customer level discounts; said plurality of customer levels being identified by respective customer level codes;

means for entering a customer level code and an item or service code; said entering means including a card reader for reading a customer level from a card;

means responsive to an entered customer level code and an entered item or service code for selecting from said storing means a unit price of an item or service corresponding to said entered customer level code and item or service code; and means for using said selected unit price in a registration operation.

11. An electronic cash register comprising:

means for storing respective unit prices for each of a plurality of customer levels for at least one predetermined purchasable item or service which is subject to differing customer level discounts; said plurality of customer levels being identified by respective customer level codes;

means for entering a customer level code and an item or service code;

means responsive to an entered customer level code and an entered item or service code for selecting from said storing means a series of unit prices of items or services corresponding to said entered customer level code and a subsequently entered series of item or service codes without requiring another entry of said entered customer level code for each item or service in said series subject to the same entered customer level code;

means for using said selected unit prices in a registration operation; and temporary change data entry means for entering temporary change data, and means responsive to an entered temporary change data and to a subsequently entered customer level code for causing said selecting means to thereafter select unit prices in accordance with said subsequently entered customer level code and item or service codes entered after entry of said subsequently entered customer level code.

12. An electronic cash register as in claim 11, wherein said entering means comprises a plurality of selectable entry keys for entering a respective customer level code and a plurality of selectable item or service keys, each for entering a respective item or service code.

13. An electronic cash register as in claim 11, wherein said entering means includes a bar code reader for reading item or service codes.

14. An electronic cash register as in claim 11, wherein said storing means also stores a respective unit price for at least one predetermined item or service which is not subject to said customer level discounts.

15. An electronic cash register comprising:

means for storing respective unit prices for each of a plurality of customer levels for at least one predetermined purchasable item or service which is subject to differing customer level discounts; said plurality of customer levels being identified by respective customer level codes;

means for entering a customer level code and an item or service code, said entering means including a card reader for reading a customer level from a card;

means responsive to an entered customer level code and an entered item or service code for selecting from said storing means a series of unit prices of items or services corresponding to said entered customer level code and a subsequently entered series of item or service codes without requiring another entry of said entered customer level code for each item or service in said series subject to the same entered customer level code; and means for using said selected unit prices in a registration operation.

* * * * *